US 6,634,052 B2

(12) United States Patent
Hanson

(10) Patent No.: US 6,634,052 B2
(45) Date of Patent: Oct. 21, 2003

(54) APPARATUS FOR REMOTELY CLEANING INTERIOR WALLS OF TANKS FROM THE TANK EXTERIOR

(75) Inventor: Mark A. Hanson, Madison, WI (US)

(73) Assignee: Bakker Holding Son B.V. (NL)

(*) Notice: Subject to any disclaimer, the term of this patent is extended or adjusted under 35 U.S.C. 154(b) by 8 days.

(21) Appl. No.: 09/884,246

(22) Filed: Jun. 19, 2001

(65) Prior Publication Data
US 2002/0112303 A1 Aug. 22, 2002

Related U.S. Application Data
(60) Provisional application No. 60/270,547, filed on Feb. 21, 2001.

(51) Int. Cl.⁷ .............................. A47L 1/12; A01K 63/00
(52) U.S. Cl. ...................................... 15/220.2; 119/264
(58) Field of Search ........................ 15/220.2; 119/264

(56) References Cited

U.S. PATENT DOCUMENTS

| 1,357,869 | A | 11/1920 | Howard, Sr. ............. 15/250.11 |
| 1,603,175 | A | 10/1926 | Weisz ...................... 15/220.2 |
| 1,758,723 | A | 5/1930 | Thatcher ..................... 15/121 |
| 2,507,559 | A | 5/1950 | D'Andrea .................. 15/220.2 |
| 2,634,444 | A | 4/1953 | Coleman ................... 15/220.2 |
| 2,668,975 | A | 2/1954 | Narajowski ............... 15/220.2 |
| 2,700,171 | A | 1/1955 | Wiest, Jr. ................ 15/250.04 |
| 2,707,298 | A | 5/1955 | Wiest, Jr. ................ 15/236.02 |
| 2,805,438 | A | 9/1957 | Hogensen ................. 15/220.2 |
| 3,199,139 | A | 8/1965 | Vallis ......................... 401/22 |
| 3,208,090 | A | 9/1965 | Roesel, Jr. ................ 15/220.2 |
| 3,296,645 | A | 1/1967 | Shore ....................... 15/220.2 |
| 3,492,685 | A | 2/1970 | Curzon .................... 15/220.2 |
| 3,600,737 | A | 8/1971 | Shore ..................... 15/104.001 |
| 3,609,793 | A | 10/1971 | Kaftan ..................... 15/220.2 |
| 3,731,337 | A | 5/1973 | Doyel ..................... 15/220.2 |
| 3,751,750 | A | 8/1973 | Kaftan ..................... 15/220.2 |
| 3,759,621 | A | 9/1973 | De Carlo ................... 401/10 |
| 3,839,085 | A | 10/1974 | Hulvey et al. ................ 134/8 |
| D235,603 | S | 7/1975 | Doyel ......................... D32/52 |
| 3,983,591 | A | 10/1976 | Ohtaki et al. .................. 15/28 |
| 4,144,091 | A | 3/1979 | Tran .............................. 134/6 |
| 4,169,382 | A | 10/1979 | Goldman et al. ............ 374/194 |
| 4,571,766 | A | 2/1986 | Goldman et al. ............. 15/105 |
| 4,921,614 | A | 5/1990 | Frickman et al. ........... 210/695 |
| 4,977,637 | A | 12/1990 | Demers ................ 15/104.001 |
| 5,515,570 | A | 5/1996 | Muscroft ................... 15/220.2 |
| 5,601,322 | A | 2/1997 | Forest ........................... 294/3 |
| 5,779,291 | A | 7/1998 | Forest ........................... 294/3 |
| 5,906,021 | A | 5/1999 | Coffey ......................... 15/1.7 |
| 5,988,109 | A | 11/1999 | Rofen .................... 15/220.2 X |
| 6,206,978 | B1 | 3/2001 | Tsui ............................. 134/8 |
| 6,348,104 | B1 | 2/2002 | Bakker |

FOREIGN PATENT DOCUMENTS

| DE | 2042148 | * | 12/1971 | ................ 15/220.2 |
| GB | 2105977 | * | 4/1983 | ................ 15/220.2 |
| JP | 6-142013 | * | 5/1994 | ................ 15/220.2 |
| WO | WO00/40080 A1 | | 7/2000 | |

* cited by examiner

Primary Examiner—Mark Spisich
(74) Attorney, Agent, or Firm—Craig A. Fieschko, Esq.; DeWitt Ross & Stevens S.C.

(57) ABSTRACT

An apparatus for cleaning liquid-filled tanks, e.g., aquariums, includes an inner cleaning assembly which moves across the interior wall of the tank and an outer cleaning assembly which moves across the exterior wall of the tank. The inner and outer cleaning assembly are magnetically attracted to each other so that manipulation of the outer cleaning assembly results in corresponding motion of the inner cleaning assembly. The inner cleaning assembly bears a cleaning pad which moves across the tank wall to clean matter therefrom. The inner cleaning assembly is buoyant so that interruption of the magnetic engagement between the inner and outer cleaning assemblies results in the inner cleaning assembly floating to the top of the liquid-filled tank for easier retrieval. One or more accessory attachment members may be provided, each of which is removably attachable to the inner cleaning assembly, and these may bear scrapers and/or coarser or finer cleaning pads so as to allow the inner cleaning assembly to be adapted for desired cleaning operations.

26 Claims, 1 Drawing Sheet

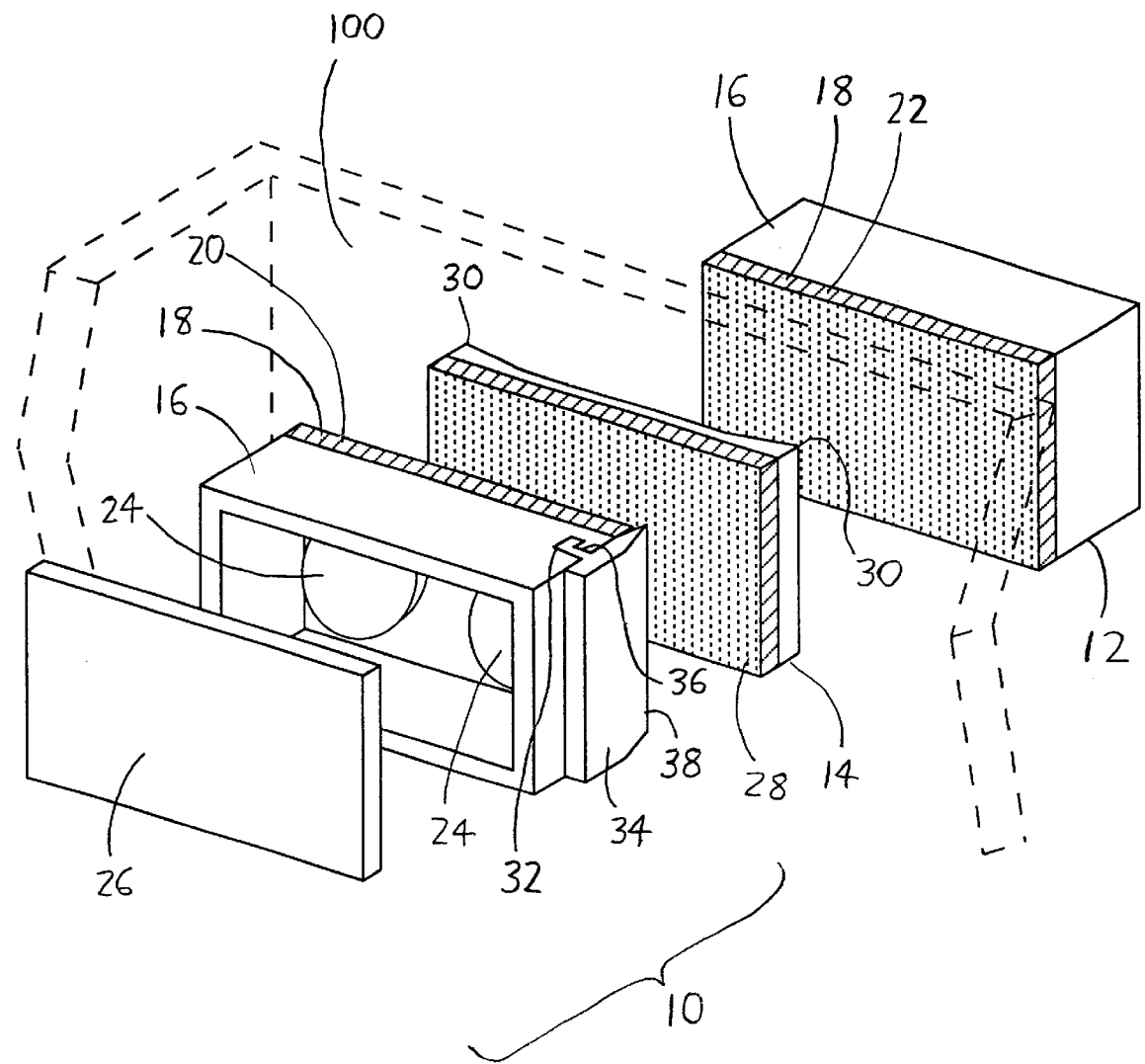

APPARATUS FOR REMOTELY CLEANING INTERIOR WALLS OF TANKS FROM THE TANK EXTERIOR

CROSS-REFERENCE TO RELATED APPLICATIONS

This application claims priority under 35 U.S.C. §119(e) to U.S. Provisional Patent Application 60/270,547 filed Feb. 21, 2001, the entirety of which is incorporated by reference herein.

FIELD OF THE INVENTION

This disclosure concerns an invention relating generally to cleaning apparatus, and more specifically to scrubbing/wiping apparata for remotely cleaning the inside walls of containers (such as fluid-filled tanks) from the outside of the container.

BACKGROUND OF THE INVENTION

It is often necessary or convenient to clean the inside walls of fluid-filled tanks from the outsides of such tanks, thereby wholly avoiding the need for the cleaning personnel to enter the fluid-filled tank. While this task is frequently encountered in large-scale industrial tanks in the food, chemical, drug, and other industries, the task's difficulties may be better grasped if considered in more common surroundings, such as the task of cleaning a home aquarium tank. Aquariums are designed to host aquatic life in a natural and attractive manner. Maintaining an attractive aquarium requires regular care and cleaning to achieve this goal. The walls of aquariums accumulate algae, including hard coralline algae, and this needs to be removed with the least amount of disturbance to the aquarium's inhabitants to maintain an attractive view. Current cleaning apparata which use razor blades to remove algae can be dangerous for the aquatic life within the aquarium (as well as for the user).

BRIEF DESCRIPTION OF THE DRAWINGS

The FIGURE presents an exploded perspective view of an exemplary tank cleaning apparatus in accordance with the invention, shown arranged about a partial view of tank walls 100 (shown in phantom).

DETAILED DESCRIPTION OF PREFERRED EMBODIMENTS OF THE INVENTION

The invention involves a tank cleaning apparatus which is intended to at least partially solve the aforementioned problems. To give the reader a basic understanding of some of the advantageous features of the invention, following is a brief summary of preferred versions of the tank cleaning apparatus. The claims set forth at the end of this document then define the various versions of the invention in which exclusive rights are secured.

With reference to the accompanying FIGURE, an exemplary apparatus for cleaning the inner surfaces of tanks, e.g., aquariums and the like, is shown by a pair of cleaning assemblies 10 and 12 adapted for mutual magnetic engagement on opposite sides of an aquarium tank wall 100 (shown in phantom), and an optional accessory attachment member 14 to be described elsewhere in this document. Both of the cleaning assemblies 10 and 12 include an enclosure housing 16 of waterproof or water-resistant material which has an engagement face 18 intended to ride across the aquarium walls. The engagement face 18 of the inner cleaning assembly 10 bears a cleaning pad 20 made of scrubbing material. This scrubbing material may be fabric, a tendril-bearing material such as VELCRO hook-and-loop material, or other semi-abrasive materials which are useful to remove algae and dirt (such as scrubbing materials commonly used for kitchen and bathroom cleaning implements), but which are not so hard that they scratch the aquarium walls 100. The engagement face 18 of the outer cleaning assembly 12 includes a sliding pad 22 which is preferably made of felt or a similar low-friction material which allows the outer cleaning assembly 12 to slide across the outside wall 100 of the aquarium without scratching it. However, this sliding pad 22 may also be made of scrubbing material such as hook-and-loop material; as an example, it may be made of loop-bearing fabric where the cleaning pad 20 is made of hook-bearing fabric, thereby allowing the inner and outer cleaning assemblies 10 and 12 to be affixed together at their engagement faces 18 for convenient storage as a unit when not in use.

At least one strong permanent magnet 24, e.g., a rare earth magnet, is secured within the enclosure housing 16 of at least one of the cleaning assemblies 10 and 12, with the other cleaning assembly having magnetically attractable material therein, such as another magnet 24 or one or more pieces of a magnetically attractable metal. Most preferably, the enclosure housing 16 of both cleaning assemblies 10 and 12 include at least one magnet therein. A particularly preferred arrangement is to include two or more magnets 24 within each cleaning assembly so that the magnets 24 are spaced along a plane parallel to the engagement face 18 of each cleaning assembly. These magnets 24 are situated in close proximity to their engagement faces 18 so that the magnets 24 will thus be in close proximity to each other when the engagement faces 18 are situated on opposite sides of an aquarium wall 100, thereby pulling the engagement faces 18 tightly against the aquarium wall 100. The use of multiple spaced magnets 24 within each assembly can be useful to more closely maintain the orientation of the inner cleaning assembly 10 in accordance with that of the outer cleaning assembly 12, i.e., the edges of the engagement faces 18 of the assemblies 10 and 12 will be maintained in alignment (or nearly so). In the FIGURE, the outer cleaning assembly 12 is illustrated with a door 26 in its enclosure housing 16 (shown removed) allowing access to the magnets 24 therein. The magnets 24 may be adhered to the enclosure housing 16 of their cleaning assemblies by use of adhesives; may be secured within sockets formed within their cleaning assemblies; and/or may be removably held in place within their enclosure housings 16 by flanges or other protrusions extending from the door 26 in the assembly from which the enclosure of the enclosure housing 16 is accessed.

In the most preferred versions of the invention, at least the inner cleaning assembly 10 is buoyant so that it floats within the fluid-filled tank 100 and within the user's reach if its magnetic engagement with the outer cleaning assembly 12 is defeated. This buoyancy of the inner cleaning assembly 10 may be accomplished, for example, by making its enclosure housing 16 hollow and watertight, and of such a size that it contains sufficient air to offset the weight of the assembly. Alternatively or additionally, the inner cleaning assembly 10 could be formed of a closed-cell foam or other buoyant material. Forming the inner cleaning assembly 10 of a flexible closed-cell foam, such as flexible polyurethane foam wherein the magnet(s) 24 are embedded, has the additional advantage that the inner cleaning assembly 10 may be able to bend to better conform to the contours of the inner tank walls 100. Where one or more of the cleaning assemblies 10 and 12 are made of foam or similar materials, closed-cell foam is preferred over open-cell foam to avoid the assembly's absorption of fluid via a sponging action, though open-cell foam with sealed exterior surfaces may acceptably avoid this effect. As a result of the buoyancy of the inner cleaning assembly 10, it will float to the top of the tank 100 if its magnetic engagement with the outer cleaning assembly 12 is defeated, and there is no need for tethers or other structure extending from the outside of the tank 100 to the inner cleaning assembly 10 to fish it out of the tank 100 from a submerged location. While such tethers could alternatively or additionally be used with the assembly 10, they are preferably avoided because they can disrupt aquatic life and get snagged on interior aquarium decorations. Since the inner cleaning assembly 10 is buoyant and lightweight, it is less likely to disengage during cleaning, and it is also less likely to crack the aquarium wall 100.

A significant advantage is obtained where the cleaning pad 20 of the inner cleaning assembly 10, and/or the sliding pad 22 of the outer cleaning assembly 12, are made of hook-and-loop material. This allows an accessory attachment member 14 which also bears hook-and-loop material 28 to engage to the cleaning pad 20 or sliding pad 22 so that the accessory attachment member 14 may be situated between the cleaning pad 20 of the inner cleaning assembly 10 and the sliding pad 22 of the outer cleaning assembly 12 when the cleaning pad 20 and sliding pad 22 are magnetically attracted into close proximity on opposite sides of a tank wall 100. As an example, an accessory attachment member 14 may be formed of fine (less coarse) scrubbing material backed by hook-and-loop material 28 so that the accessory attachment member 14 can engage to the cleaning pad 20 of the inner cleaning assembly 10, thereby effectively situating the fine scrubbing material on the engagement face 18 of the inner cleaning assembly 10. This can be helpful where the tank cleaning apparatus is to be used in both glass aquariums, which may benefit from more coarse scrubbing material, and acrylic tanks, which may require fine scrubbing material to avoid scratching. As another example, an accessory attachment member 14 could be formed of a metal or hard plastic plate backed by hook-and-loop material, wherein this plate has protruding corners or other structure so as to define one or more hard scraping ridges 30 to be situated on or adjacent to the engagement face 18 of the inner cleaning assembly 10 for removal of hard coralline algae.

A accessory attachment member as described above can also be provided as an attachment which is affixable and removable from portions of the inner cleaning assembly 10 apart from its engagement face 18. In the FIGURE, the inner cleaning assembly 10 has a bent or dovetailed slot 32 that runs along at least a portion of its length, and a accessory attachment member 34 is provided with a flange 36 that may be complementarily fit within the slot 32 so that the accessory attachment member 34 may be slidably engaged to the inner cleaning assembly 10. Alternatively, the accessory attachment member 34 may be affixed to the inner cleaning assembly 10 by other complementary engaging structures, permanent or removable fasteners, or adhesives. The accessory attachment member 34 may be made of a hard material such as acrylic or other hard plastics, metal, or ceramic materials, and its scraping ridge 38 may be provided by a single sharp corner that bears against the aquarium wall. Alternatively, as shown by the accessory attachment member 14, where the accessory attachment member has a face which rests on the aquarium's inner wall (rather than just a corner), the scraping ridges may be provided by sharp or semi-sharp corners on opposing edges of this face, or the scraping ridges may alternatively be provided by a series of raised ridges extending across this face. Rather than being permanent, the scraping ridge(s) could additionally or alternatively be provided by inserts which are replaceable, e.g., by removable and replaceable blades, which also allows a user to remove selected ridges so that only a desired number of ridges are included.

To initiate cleaning, one cleaning assembly is disposed with its engagement face 18 on the inner surface of an aquarium wall 100, and the other cleaning assembly is disposed on the outer surface of the aquarium wall 100 directly adjacent to the inner cleaning assembly 10 and in magnetic engagement therewith. Translational movement of the outer cleaning assembly 12 causes likewise translation of the inner cleaning assembly 10 across the inner surface of the aquarium wall 100 to cause the scrubbing material of the cleaning pad 20 on the engagement face 18 to remove the accumulated algae and dirt therefrom.

It should be understood that the various preferred versions of the invention are described above and shown in the drawings to illustrate different possible features of the invention and the varying ways in which these features may be combined. Apart from combining the different features of the above embodiments in varying ways, other modifications are also considered to be within the scope of the invention. Following is an exemplary list of such modifications.

First, it should be understood that the inner and outer cleaning assemblies 10 and 12 may be made identically so that they can each be similarly manufactured, and each can be used in the interior or exterior of the aquarium. It is noted that throughout this document, when it is stated that the cleaning assemblies are "identical", this is intended to mean that the cleaning assemblies are products of the same manufacturing process and are thus identical in all substantial structural respects; however, they may have different colors, or perhaps different materials (perhaps being molded from different plastics), or other differences which give rise to different appearances but no substantial difference in performance.

Second, it is emphasized that the cleaning pad 20 may be permanently or replaceably provided on the inner cleaning assembly 10 (and the outer cleaning assembly 12 if desired), as by providing it as an insert on the cleaning assembly or assemblies, as an adhesive applique, or otherwise providing it as a removable and replaceable component so that it may be replaced when worn. As an example, adhesive-backed VELCRO hook-and-loop fastener material may be semi-permanently adhered to the engagement face 18 of the inner cleaning assembly 10. The inner cleaning assembly 10 may have rounded corners bounding the engagement face 18 so that when the hook-and-loop material extends around these corners, the hook-and-loop material will bend to define sharper corners on the engagement face 18, with these hook-and-loop corners being well suited to scrub the corners of the inner wall of the aquarium 100. Once this cleaning pad 20 becomes worn, it may be peeled off of the engagement face 18 and replaced.

Third, a accessory attachment member similar to the accessory attachment member 14 may be fit on a different face of the inner cleaning assembly 10 than the engagement face 18 upon which the cleaning pad 20 is provided—for example, on a face adjacent to the engagement face 18—so that either the accessory attachment member or the cleaning pad 20 may be used as the user desires, by simply situating the desired face against the wall of the aquarium 100. The accessory attachment member may instead be fit on the same engagement face 18 of the inner cleaning assembly 10 as the cleaning pad 20, with the cleaning pad 20 also being removably attached to the engagement face 18 of the inner cleaning assembly 10, so that the accessory attachment member and cleaning pad 20 may be removed and interchangeably replaced. The accessory attachment member could instead be fit alongside the cleaning pad 20 on the same or adjacent faces of the inner cleaning assembly 10 as the cleaning pad 20 so that both the cleaning pad 20 and accessory attachment member may be used simultaneously. It is also possible to provide more than one accessory attachment member, e.g., on the faces of the inner cleaning assembly 10 adjacent the engagement face 18 bearing the cleaning pad 20, so that the scraping ridges of these accessory attachment members protrude to rest within generally the same plane as the cleaning pad 20, whereby both the scraping ridges and cleaning pad 20 will bear against the aquarium walls at the same time.

Fourth, the inner and/or outer assemblies (or merely their engagement faces 18) can be made of flexible material that will conform to the contours of aquarium walls 100 of any shape so that contact between the aquarium walls 100 and the cleaning pad 20 is maximized. If the inner and/or outer assemblies are rigid, this flexibility can be provided by situating a flexible pad between the cleaning pad 20 and the engagement face 18 of the inner cleaning assembly 10, and/or between the sliding pad 22 and the engagement face 18 of the outer cleaning assembly 12.

Fifth, it is also possible to make the inner cleaning assembly 10 capable of traversing corners within the interior of the aquarium 100 when the outer cleaning assembly 12 is moved across the outer surface of the aquarium 100 and around a corner. As one example, when cleaning assemblies 10 and 12 are defined by rectangular prisms, such as those shown in the FIGURE, and the cleaning assemblies are to be used in a rectangular aquarium, the cleaning assemblies might have multiple faces covered by cleaning or sliding pads 20 or 22, and the magnet or magnets 24 within their enclosure housings might be freely movable therein, or might alternatively be mounted therein on a rotatable axle or other moving structure which allows the magnet(s) 24 to move adjacent to different faces of the cleaning assemblies. To illustrate, a user might slide the outer cleaning assembly 12 along the outside of a first aquarium wall up to a corner where the first aquarium wall joins a second aquarium wall. This causes the inner cleaning assembly 10 to similarly slide upon the first aquarium wall (and within the aquarium 100) to abut the corner, with one of its faces abutting the first aquarium wall and an adjacent one of its faces abutting the second aquarium wall. As the user then slides the outer cleaning assembly 12 around the corner to the second aquarium wall, and maintains the outer cleaning assembly in close proximity to the aquarium wall, the magnet(s) 24 will move within the inner cleaning assembly 10 to a location adjacent the face of the first cleaning assembly 10 which abuts the second aquarium wall. Thus, the user may have the second cleaning assembly 12 orbit the aquarium 100, and each side about a circumference of the first cleaning assembly 10 will clean a different wall of the aquarium. As another exemplary arrangement, the inner cleaning assembly 10 can be formed of a pliable, sack-like outer enclosure housing made of abrasive material, such as woven synthetic material commonly used in abrasive mitts and cookware scrubbers, with magnetic (or magnetically attractable) bearings situated within the enclosure housing. Chunks or balls of foam or other material can also be included in the enclosure housing if flotation of the inner cleaning assembly 10 is desired. The inner cleaning assembly 10 might then resemble a beanbag in that it may have sufficient flexibility to slide along a first inner aquarium wall up to a corner within the interior of the aquarium 100. It may then rest in this interior corner as the outer cleaning assembly 12 moves about the exterior corner of the aquarium, and may then move onto the adjacent wall of the aquarium 100 as the outer cleaning assembly 12 passes the corner. The pliable shape of the inner cleaning assembly 10 allows it to effectively flex or roll around interior corners when desired. Buoyancy may also be provided in this version of the invention by forming the enclosure housing of the inner cleaning assembly 10 of an airtight gas-filled pouch, somewhat like a balloon, wherein magnetic members are situated.

The invention is not intended to be limited to the preferred versions described above, but rather is intended to be limited only by the claims set out below. Thus, the invention encompasses all alternate embodiments that fall literally or equivalently within the scope of these claims.

What is claimed is:

1. A tank cleaning apparatus comprising:
   a. a first cleaning assembly having a cleaning pad situated thereon, the cleaning pad being made of scrubbing material, the first cleaning assembly being buoyant when placed in water;
   b. a second cleaning assembly having a sliding pad situated thereon;
   c. at least one accessory attachment member bearing hook-and-loop material, the accessory attachment member being configured to engage to the cleaning pad of the first cleaning assembly, wherein;
      (1) one of the first and second cleaning assemblies includes a magnet,
      (2) the other of the first and second cleaning assemblies includes magnetically attractable material arranged in such a manner that the cleaning pad is pulled toward the sliding pad when the cleaning pad and sliding pad are in close proximity, and
      (3) the accessory attachment member, when engaged to the cleaning pad of the first cleaning assembly, is situated between the cleaning pad of the first cleaning assembly and the sliding pad of the second cleaning assembly when the cleaning pad and sliding pad are magnetically attracted into close proximity.

2. The tank cleaning apparatus of claim 1 wherein the cleaning pad and sliding pad are both made of scrubbing material.

3. The tank cleaning apparatus of claim 1 wherein the first cleaning assembly is identical to the second cleaning assembly.

4. The tank cleaning apparatus of claim 1 wherein the scrubbing material is hook-and-loop material.

5. The tank cleaning apparatus of claim 4 wherein the sliding pad is also made of hook-and-loop material, with the sliding pad of the second cleaning assembly being affixable to the cleaning pad of the first cleaning assembly to allow storage of the tank cleaning apparatus as a unit.

6. The tank cleaning apparatus of claim 1 wherein the accessory attachment member bears at least one of coarse scrubbing material, fine scrubbing material, or a scraper bearing a sharp elongated ridge thereon.

7. The tank cleaning apparatus of claim 1 wherein the first cleaning assembly contains two or more magnets therein, the magnets being spaced along a plane parallel to the cleaning pad.

8. The tank cleaning apparatus of claim 1 wherein the first cleaning assembly is hollow and includes sufficient air therein that the first cleaning assembly will float in water.

9. The tank cleaning apparatus of claim 1 wherein the accessory attachment member bear at least one scraping ridge thereon.

10. The tank cleaning apparatus of claim 1 further comprising a scraping ridge removably attachable to the first cleaning assembly at a location adjacent to the cleaning pad.

11. The tank cleaning apparatus of claim 1 further comprising a scraping ridge removably attachable to the first cleaning assembly by a protruding member extending from the scraping ridge and being received in the first cleaning assembly.

12. The tank cleaning apparatus of claim 11, wherein the protruding member is a flange received within a slot in the first cleaning assembly.

13. A tank cleaning apparatus comprising:
   a. a first cleaning assembly having a cleaning pad situated thereon, the cleaning pad being made of scrubbing material, the first cleaning assembly being buoyant when placed in water;
   b. a second cleaning assembly having a sliding pad situated thereon; and
   c. an accessory attachment member removably attachable to the cleaning pad of the first cleaning assembly,
wherein one of the first and second cleaning assemblies includes a magnet and the other of the first and second cleaning assemblies includes magnetically attractable material arranged in such a manner that the cleaning pad is pulled toward the sliding pad when the cleaning pad and sliding pad are in close proximity.

14. The tank cleaning apparatus of claim 13 wherein the accessory attachment member bears hook-and-loop material configured to engage to the cleaning pad of the first cleaning assembly.

15. The tank cleaning apparatus of claim 13 wherein the accessory attachment member bears at least one of coarse scrubbing material, fine scrubbing material, or a scraper bearing a scraping ridge thereon.

16. The tank cleaning apparatus of claim 13 wherein the sliding pad is made of scubbing material.

17. The tank cleaning apparatus of claim 13 wherein the first cleaning assembly is identical to the second cleaning assembly.

18. The tank cleaning apparatus of claim 13 wherein the scrubbing material is hook-and-loop material.

19. The tank cleaning apparatus of claim 13 wherein the cleaning pad and sliding pad are made of hook-and-loop material, with the sliding pad of the second cleaning assembly being affixable to the cleaning pad of the first cleaning assembly to allow storage of the tank cleaning apparatus as a unit.

20. A tank cleaning apparatus comprising:
   a. a first cleaning assembly having a cleaning pad situated thereon, the cleaning pad being made of scrubbing material, the first cleaning assembly being buoyant when placed in water;
   b. a second cleaning assembly having a sliding pad situated thereon; and
   c. at least one accessory attachment member bearing hook-and-loop material configured to engage to the first cleaning assembly,
wherein one of the first and second cleaning assemblies includes a magnet and the other of the first and second cleaning assemblies includes magnetically attractable material arranged in such a manner that the cleaning pad is pulled toward the sliding pad when the cleaning pad and sliding pad are in close proximity.

21. The tank cleaning apparatus of claim 20 wherein the hook-and-loop material of the accessory attachment member is configured to engage to the cleaning pad of the first cleaning assembly.

22. The tank cleaning apparatus of claim 20 wherein the accessory attachment member bears at least one of coarse scrubbing material, fine scrubbing material, or a scraper bearing a scraping ridge thereon.

23. The tank cleaning apparatus of claim 20 wherein the sliding pad is made of scubbing material.

24. The tank cleaning apparatus of claim 20 wherein the first cleaning assembly is identical to the second cleaning assembly.

25. The tank cleaning apparatus of claim 20 wherein the scrubbing material is hook-and-loop material.

26. The tank cleaning apparatus of claim 20 wherein the cleaning pad and sliding pad are made of hook-and-loop material, with the sliding pad of the second cleaning assembly being affixable to the cleaning pad of the first cleaning assembly to allow storage of the tank cleaning apparatus as a unit.

* * * * *